United States Patent Office

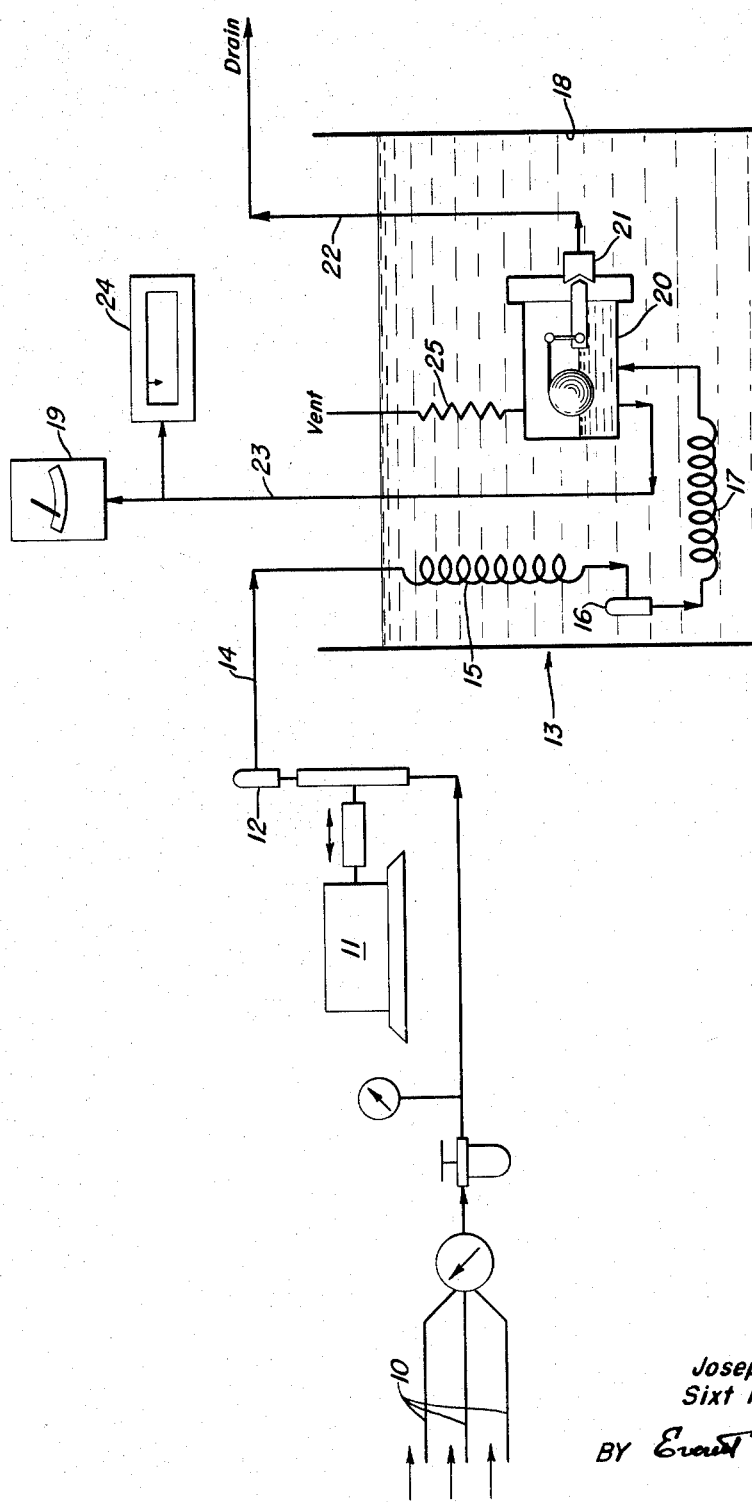

2,847,852
Patented Aug. 19, 1958

2,847,852

LIGHT ENDS RECORDER

Joseph C. Rhodes, Park Forest, and Sixt Frederick Kapff, Homewood, Ill., assignors to Standard Oil Company, Chicago, Ill., a corporation of Indiana Application March 7, 1957, Serial No. 644,660

7 Claims. (Cl. 73—53)

This invention relates to an improved apparatus for automatically determining volatility characteristics of liquids. More particularly the invention relates to improvements in devices for determining distillation characteristics of gasoline.

In the blending of gasolines, among the primary specifications to be maintained are those defining front end volatility. These include the Reid vapor pressure and the percentage distilled under carefully controlled temperature conditions.

The percentage distilled may be determined by vaporizing a portion of the gasoline under carefully controlled conditions and noting the volumes vaporized at different temperature levels. For example, the volatility specification may state the limits of the percent of the sample which will have distilled off when a temperature of 158° F. has been reached. This specification, called the "percent 158," has different volume ranges corresponding to seasonal gasoline variations. Although the ASTM distillation test (ASTM Test D86–52) is a desirable specification, the test as performed manually or batchwise is a time-consuming operation which does not lend itself to routine or wide-spread use for product and process control.

It has been proposed that the vapor pressure and the light end distillation characteristics of liquids be continuously and automatically determined by withdrawing a sample from a source of liquid at a constant rate of flow, preheating the sample, and introducing it into a vapor-liquid separating chamber maintained within a constant temperature bath. A free surface of liquid is maintained within the separating chamber and the pressure within the chamber developed with a uniform venting of gasiform fluids is proportional to the vapor pressure of the liquid and is an indication of the front end volatility at the temperature of the constant temperature bath. In the case of determining vapor pressure, a capillary vent, leading from the vapor-liquid separating chamber to the atmosphere, is provided to continuously bleed off only air and dissolved fixed gases. In the case of determining the front end volatility (as for example according to ASTM Test D86–52) the vent comprises a capillary which is adapted to pass a considerable volume of distillate, but the length and cross-sectional flow area thereof is selected so as to render the vapor pressure in the vapor-liquid separating chamber substantially insensitive to the Reid vapor pressure of the sample. It will be recognized that a different temperature level will be maintained in the constant temperature bath depending upon the test to be made, i. e. for vapor pressure or for distillation characteristics. In general higher temperatures are employed when the distillation characteristics are to be determined. Typically a temperature of 145° F. may be used in making the vapor pressure determinations and a temperature of the order of 195° F. in the front end volatility test.

One of the difficulties experienced with apparatus of this type is that excessive oscillation of the pressure indicator communicating with the liquid phase in the liquid-vapor separator can occur when samples of high Reid vapor pressure are under test. At times the indicating needle might oscillate through a range which is two or three times as large as the average error for the instrument.

It will be apparent that the accuracy of the pressure measurement is very important to the automatic Reid vapor test as well as in the determination of the distillation characteristics and it is with respect to this problem that our invention relates.

It is, therefore, a primary object of our invention to provide an improved apparatus for use in automatically and continuously determining vapor pressure and light end distillation characteristics of liquids. Another object of the invention is to provide an improved assembly whereby the problems previously encountered in such apparatus are substantially eliminated. A more specific object of the invention is to provide an apparatus which avoids the oscillation of the pressure indicator as discussed above. These and other objects of the invention will become apparent as the description thereof proceeds.

In the drawing we have illustrated schematically an embodiment of the apparatus employing our invention.

Referring to the drawing, a gasoline blend is introduced by a sample line 10 and pumped at a uniform rate by pump 11 through the check valve 12 and into the vapor pressure apparatus 13 via line 14, through preheating coil 15, relief valve 16, and second preheating coil 17, all disposed within constant temperature bath 18.

We provide the series preheating coils 15 and 17, and the intermediate reducing valve 16 to avoid the oscillation of the pressure indicator 19 which might otherwise occur due to uneven boiling in preheating the liquid prior its introduction into the float chamber 20.

The preheater coil 15 may comprise about six feet of ⅛ inch stainless steel tubing whereas the secondary preheater tube 17 comprises a coil of ¼ inch tubing about 20 feet long which discharges into the float chamber 20 below the liquid phase maintained therein.

The pressure reducing valve 16 is set to relieve at 30 p. s. i. into the larger secondary preheater tube 17. This combination of elements eliminates any tendency toward the oscillations which were previously observed.

The primary preheater coil 15 serves to heat the incoming sample supplied via line 14 to the temperature of the bath 18. When the preheated sample passes through the valve 16 the pressure of the sample is suddenly reduced. Such pressure reduction triggers the boiling of the sample so that it boils uniformly and the heat necessary to evaporate the lighter components is supplied from the bath 18 in passing through the larger secondary preheater tube 17.

The preheated and partially vaporized sample flows from the coil 17 into the float chamber 20 in which a constant level of sample liquid is maintained by float valve 21. Excess liquids flow from the chamber 20 by means of the outlet line 22 which is controlled by the float valve 21.

A pressure indicator 19 is attached to the chamber 20 via impulse line 23 so as to measure the pressure within the chamber 20 and preferably communicates with the liquid phase of the chamber 20. In addition to the gauge 19 a vapor pressure recorder 24 may be provided.

Attached to the upper end of the float chamber 20 (it may communicate with any portion of the space above the liquid level maintained in chamber 20) is a vent capillary 25 which bleeds vapors and/or fixed gases from the float chamber 20, the capillary means 25 having a substantial length thereof immersed in the constant temperature bath 18.

A suitable vent 25 is selected depending upon the use to which the apparatus is to be put. In a typical apparatus for making Reid vapor pressure determinations, the venting capillary 25 releases about 60 cc. of gases and air per minute and there is substantially no stripping of hydrocarbons from the liquid phase. However, when the light ends characteristics are to be determined there is a substantial distillation of hydrocarbons through the venting capillary 25 which typically vents about 0.1 standard cubic foot per minute.

Any means for controlling the bath temperature may be used. However, one means for effecting such control is to provide a constant temperature bath comprising an insulated vessel with an electrical coil heater which may be controlled by means of a thermoswitch. The thermoswitch may be connected to a suitable relay whereby current is supplied to the coil heater in response to changes in the temperature of the bath 18 as sensed by the thermoswitch.

Although we have described our invention with reference to a preferred embodiment thereof, it should be understood that this is by way of illustration only. In any event, modifications in the apparatus and in the techniques employing the apparatus will become apparent to those skilled in the art and can be made without departing from the spirit and scope of the invention.

What we claim is:

1. An apparatus for continuously determining the volatility characteristics of a liquid which comprises means for supplying liquid at a uniform flow rate and pressure into a first heating means, means for heating the liquid to an equilibrium temperature in said first heating means, second means for maintaining the preheated sample at a constant temperature, pressure-reducing means interposed the flow between said first and second heating means, vapor-liquid separation chamber means into which said second means discharges, and means for measuring the pressure in said chamber as an indication of the volatility characteristics of the sample.

2. In an apparatus for determining the volatility characteristics of a flowing liquid stream of the type comprising a vapor-liquid separating chamber, means for introducing the sample into said chamber, means for heating the sample prior to introduction into said chamber, means for maintaining a free surface of liquid in said chamber, capillary vent means for said chamber, and a pressure indicating means communicating with said chamber, the improved means for heating which comprises a pair of preheating coils arranged for series flow within a constant temperature bath, and a pressure-reducing valve means interposed the flow between said preheating coils, whereby the pressure is reduced to trigger uniform boiling of the preheated sample in said second preheating coil before it is introduced into the said chamber.

3. An apparatus for determining the volatility characteristics of a flowing liquid stream which apparatus comprises in combination a constant temperature bath, a liquid-vapor chamber within said constant temperature bath, a sample conduit discharging into said chamber, pump means for flowing a stream of liquid at a substantially constant rate and pressure through said conduit, a float-controlled outlet from said chamber, said conduit including first and second preheater coils and pressure reducing valve means interposed said first and second preheater coils, a capillary tube connected to the said chamber above the liquid level maintained therein and immersed in said bath, and means connected to said chamber for indicating the pressure on said liquid in said chamber as a measure of the volatility characteristics of the sample under test.

4. An apparatus for automatically determining the volatility characteristics of liquids comprising in combination a vapor-liquid separating chamber, a controlled temperature bath means within which said chamber is immersed, series flow preheater coil means having an upstream portion and a downstream portion in said bath means, said downstream portion discharging preheated sample into said chamber, pressure reducing valve means interposed said upstream and downstream portions of preheater coil means and adapted to trigger boiling of the sample in the downstream portion of said preheater coil means, float-controlled outlet valve means in said chamber, capillary vent means communicating with said chamber above the liquid level maintained therein by said float-controlled valve means, said capillary vent means having a substantial portion of its length immersed within said constant temperature bath means, and pressure-responsive means connected to said chamber to indicate the pressure on the liquid therein as a measure of the volatility characteristics of the sample under test.

5. The apparatus of claim 1 wherein said first heating means is of substantially smaller volumetric capacity than said second heating means and serves to bring the sample to the temperature of the bath.

6. The apparatus of claim 1 wherein the first heating means comprises a relatively short length of a relatively small diameter tube and said second heating means is a substantially longer length of tube and of substantially greater diameter than said first heating means.

7. The apparatus of claim 1 wherein said pressure reducing means is set to operate so as to suddenly reduce the pressure on the stream flowing from the first heating means and discharging into said second heating means.

References Cited in the file of this patent

UNITED STATES PATENTS

| | | |
|---|---|---|
| 2,002,101 | Yalby et al. | May 21, 1935 |
| 2,119,786 | Kallam | June 7, 1938 |
| 2,769,336 | Segers et al. | Nov. 6, 1956 |
| 2,811,851 | Jacobs | Nov. 5, 1957 |